United States Patent
Minkenberg et al.

[11] Patent Number: 5,865,285
[45] Date of Patent: Feb. 2, 1999

[54] MANUAL DRIVE OPERATING IN BOTH DIRECTIONS TO PRODUCE A ROTARY MOVEMENT, MORE PARTICULARLY FOR VEHICLE SEATS

[75] Inventors: Andreas Minkenberg, Coburg; Peter Schumann, Untersiemau; Markus Fischer; Michael Forkel, both of Coburg, all of Germany

[73] Assignee: Brose Fahrzeugteile GmbH & Co. KG, Coburg, Coburg, Germany

[21] Appl. No.: 875,712

[22] PCT Filed: Feb. 5, 1996

[86] PCT No.: PCT/DE96/00211

§ 371 Date: Aug. 1, 1997

§ 102(e) Date: Aug. 1, 1997

[87] PCT Pub. No.: WO96/23672

PCT Pub. Date: Aug. 8, 1996

[30] Foreign Application Priority Data

Feb. 3, 1995 [DE] Germany .................. 195 03 505.4
Jul. 29, 1995 [DE] Germany .................. 195 27 912.3

[51] Int. Cl.⁶ .................................................. F16D 67/02
[52] U.S. Cl. ............................ 192/15; 192/43.1; 74/143; 297/366
[58] Field of Search .................................. 297/366, 367, 297/361.1, 362.12, 373; 192/15, 43.1; 74/143, 576

[56] References Cited

U.S. PATENT DOCUMENTS

| | | | |
|---|---|---|---|
| 306,312 | 10/1884 | Appleman | 74/497 |
| 791,267 | 5/1905 | Jaegers | 192/43.1 |
| 2,206,943 | 7/1940 | Costello | 192/43.1 |
| 2,828,647 | 4/1958 | Reinsch | 74/576 |
| 2,892,487 | 6/1959 | Herider et al. | 297/339 X |
| 3,044,591 | 7/1962 | Kilness | 74/530 X |
| 4,220,294 | 9/1980 | DiPoala | 74/576 X |
| 4,243,264 | 1/1981 | Bell | 297/367 |
| 4,903,931 | 2/1990 | Shimazaki . | |
| 5,007,611 | 4/1991 | Kanai . | |
| 5,622,089 | 4/1997 | Gifford, Sr. | 192/43.1 X |

FOREIGN PATENT DOCUMENTS

| | | | |
|---|---|---|---|
| 0245861 | 11/1987 | European Pat. Off. | 297/367 |
| 0505090 | 9/1992 | European Pat. Off. . | |
| 931033 | 7/1955 | Germany | 297/367 |
| 1933 | 1/1971 | Germany | 297/366 |
| 3608858 | 10/1987 | Germany . | |
| 4120617 | 12/1992 | Germany . | |
| 4123103 | 1/1993 | Germany . | |
| 229145 | 7/1969 | U.S.S.R. | 74/143 |
| 404199 | 11/1909 | United Kingdom | 192/43.1 |
| 2117440 | 10/1983 | United Kingdom | 297/366 |

*Primary Examiner*—Peter M. Cuomo
*Assistant Examiner*—David E. Allred
*Attorney, Agent, or Firm*—Christie, Parker & Hale, LLP

[57] ABSTRACT

A manual drive for producing rotary movement in both clockwise and counterclockwise directions includes a drive lever which has a neutral position from which it can move into a first or second rotary direction. Attached to the drive lever are a pair of detent elements, one controlling clockwise rotation of the drive wheel and the other controlling counter-clockwise rotation. The detent elements have teething elements on a free end for engagement with a drive wheel which has counter teething about its circumference. The detent elements engage the drive wheel in the neutral position. The detent elements slide in a slide guide which lifts one of the detent elements out of engagement with the drive wheel when the drive lever moves in the opposite rotary direction. Springs located on either side of the slide guide lift the detent element on the drive side out of engagement with the drive wheel as the drive lever returns to the neutral position.

6 Claims, 6 Drawing Sheets

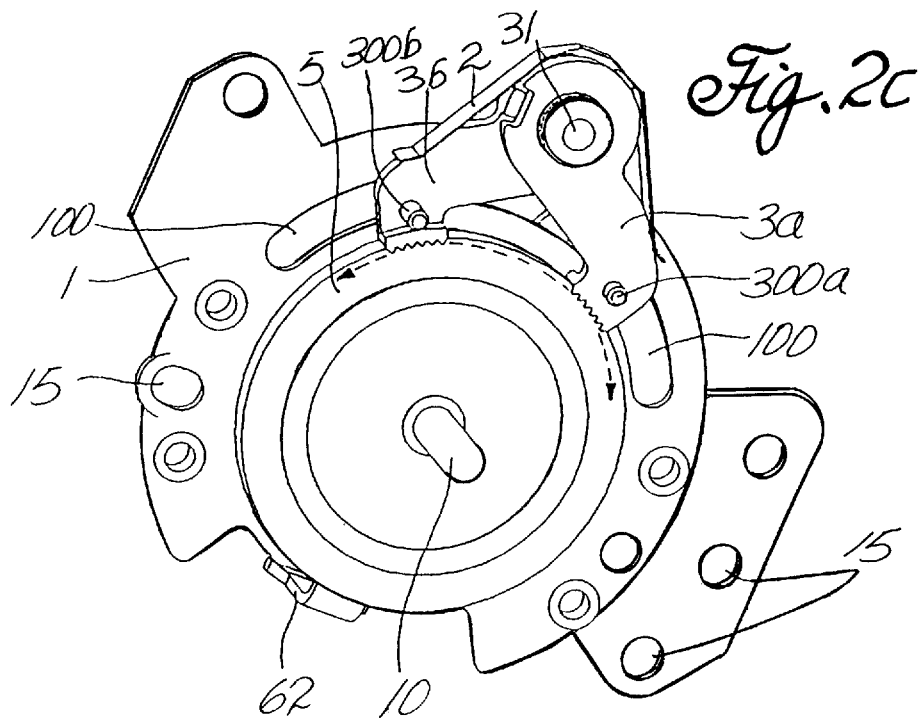
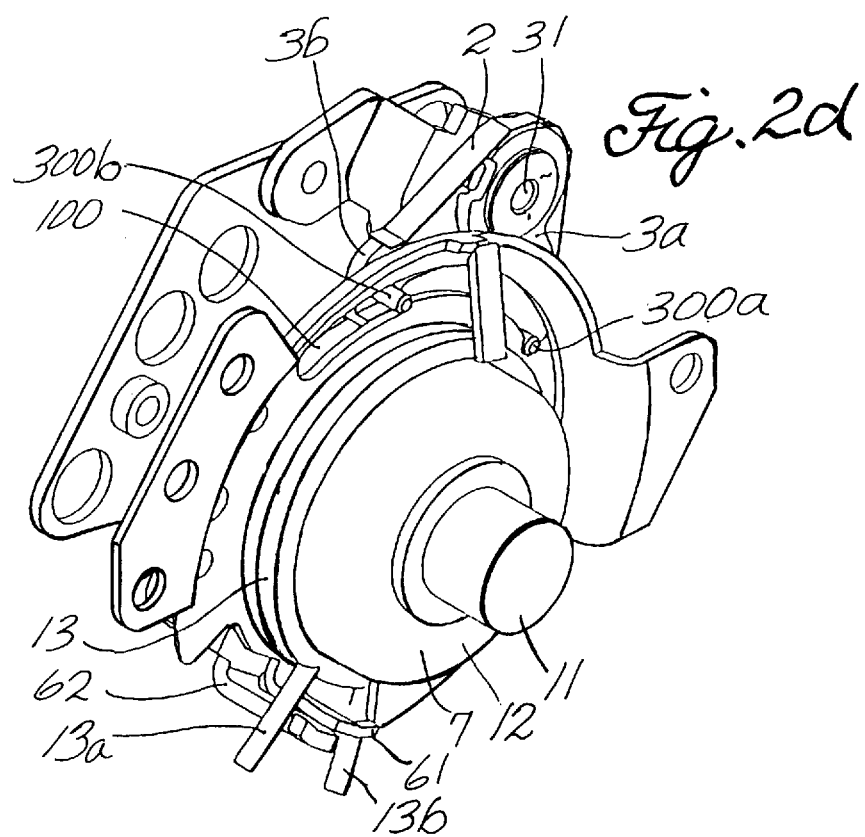

MANUAL DRIVE OPERATING IN BOTH DIRECTIONS TO PRODUCE A ROTARY MOVEMENT, MORE PARTICULARLY FOR VEHICLE SEATS

BACKGROUND OF THE INVENTION

The invention relates to a manual drive to produce a rotary movement operating in both directions, that is, clockwise and counter-clockwise, and is usable with particular advantage in adjustment systems of vehicle seats. It is characterized by a finely-stepped quiet functioning.

An adjustment drive of the generic type which is to be used in particular as an articulated fitment for seat height or backrest incline adjustment in vehicle seats is described in German Patent Application DE 3 608 858 A1. According to this reference, a shaft connected to a rotary joint is mounted in a frame. The adjustment is made through a cogged setting wheel and an operating arm having two lever-like entrainment members. Two coil springs under their own tension against the cylindrical inner face of the receiving socket. Connected to the receiving socket is a setting wheel which has entrainment teeth and which is associated with the lever-like entrainment member of the operating arm. The oppositely arranged coil springs each adjoin with one end area on one end of a shaft projecting into the receiving socket and with the other end area in both directions, with some play, near a stop connected to the setting wheel. During swivel movements of the operating arm, the coil spring—which locks according the direction of rotation—is blocked by running up the stop so that the swivel movement can be converted into a rotary movement. The two entrainment members are switched through a separate spring and stop so that, depending on the swivel direction of the operating arm, the one or other entrainment member passes into engagement with an entrainment cog of the setting wheel.

With this articulated fitment the distance between each entrainment cog is so great that during switching, a comparatively large angular path has to be traveled to make up the idling process. A finely stepped adjustment of a seat is thus not possible. A further disadvantage of the adjustment drive is that the entrainment member projects over the outer contour of the setting wheel and thus increases the structural space of the adjustment drive, thus requiring the housing for the adjustment drive to be correspondingly large.

Furthermore drives called ratchets are known which have swivel detent elements supporting comparatively fine teething. The teething of the detent elements is held in permanent engagement with the counter teething of the drive through a spring. The disadvantage here however is that the returning idling stroke of the drive leads to noises because the teething of the detent element and drive wheel slide on each other.

U.S. Pat. No. 4,903,931 discloses a manual drive for a vehicle seat wherein a displacement force exerted by a drive lever is transferred through ratchet pawls to a toothed element or a drive axle connected to the toothed element. The ratchet pawls are thereby arranged to swivel in a housing which can swivel about the drive axle. Each ratchet pawl is allocated a spring which brings each ratchet pawl adjacent the toothed element. To ensure that during an upward or downward movement of the drive lever only one ratchet pawl engages with the toothed element, a cam is provided which is connected to a change-over lever which, depending on the position, presses each detent pawl away from the toothed element. To reverse the displacement direction, the change-over lever must be manually switched over.

It is therefore desirable to provide a manual drive acting in both directions to produce a rotary movement which, by using keyed locking elements, allows a very finely stepped adjustment while at the same time avoiding much of the noises normally associated with such adjustment drive, the so-called ratchet noises. Also desirable is to practically eliminate the noticeable idling stroke through the drive lever.

Further, it is desirable to provide a drive including lever-like entrainment members mounted on the operating arm that do not project over the cogged setting wheel in order to achieve a more compact structural shape.

SUMMARY OF THE INVENTION

The various embodiments of the invention are based on the basic idea of avoiding the sliding between the teething of the drive wheel and detent element during the phase when a drive (drive lever) is reset to the neutral position, and thus the resultant noises by using means which reliably lift the relevant detent element out of the counter teething of the drive wheel during the said resetting phase.

According to one embodiment of the invention, a manual drive for producing a rotary movement in both clockwise and counter-clockwise directions includes a drive axle having mounted thereon a drive lever which has a neutral position and can swivel within a restricted angle into a first and a second rotary direction and then return to the neutral position. The drive also includes a drive wheel with teething elements arranged on a circumference. First and second swivel detent elements are each connected to the drive lever at one end and have a free end provided with teething elements for engagement with the teething elements on the circumference of the drive wheel. The first swivel detent element is loaded and engages the drive wheel when the drive lever is swivelled in the first rotary direction and the second swivel detent element is loaded and engages the drive wheel when the drive lever is swivelled in the second rotary direction. A slide guide, on which the first and second swivel detent elements are slidably mounted, is configured to lift the first swivel detent element away from engagement with the drive wheel when the drive lever is swivelled in the second rotary direction and to lift the second swivel detent element away from the teething of the drive wheel when the drive lever is swivelled in the first rotary direction. Spring areas are located on either side and outside the slide guide, and each spring area has a spring element corresponding to one of the swivel detent elements. Each spring element in the respective spring area exerts a force against the engagement direction of the teething on the corresponding swivel detent element away from the teething elements on the circumference of the drive wheel. The spring force is insufficient to disengage the teething elements of the swivel detent element from the teething elements of the drive wheel when that swivel detent element is loaded, but sufficient to lift the swivel detent element out of engagement when that swivel detent element is unloaded and the drive lever is not in the neutral position.

According to another embodiment of the invention, a spring area is provided on either side of a central slide guide, each of which act on the detent elements through cams or similar structures. The spring mounted in this area enters into engagement with a cam of the detent element to lift it off the drive wheel if the latter is swivelled by swivelling the drive lever in the direction of one of two stops of the slide, that is, away from the neutral position of the drive lever in either the clockwise or counter-clockwise direction.

It must thereby be ensured that both detent elements can engage unhindered in the counter teething of the drive wheel, which is connected to the drive axle. The spring provided must therefore not exert any force on the cams of the detent element in the neutral position which would jeopardize the secure detent engagement of the detent element. Only when swivelling the drive lever out of the neutral position does the spring exert a radially directed force off the cams which is greater than the force of a further spring which acts in the opposite radial direction on the swivel detent elements to press the teething of the detent element into engagement with the teething of the drive wheel. Any idling stroke is thereby avoided.

However it is also ensured that the cogs of the detent element and drive wheel have a self-locking action under a drive load. This is achieved normally by a suitable angle between the force vector transferred by the detent element and the flanks of the cogs. Thus during operation of the drive the detent element is not pressed by the spring out of the counter teething; rather the spring is held by the cam of the detent element. Only when no more drive force acts on the detent element and the drive lever is returned to the neutral position does the spring in the area of the slide lift the relevant detent element out of the teething of the drive wheel. Thus the usual resetting noises no longer occur.

According to another embodiment, the teething of the drive wheel is internal teething and the detent elements are mounted within the outer contour of the drive wheel without necessarily providing spring elements which act on the detent elements. By arranging the detent elements inside the outer contour of the drive wheel, a compact method of construction is achieved and all mechanically movable component parts are protected. Spring elements may also be provided.

One embodiment is used in conjunction with manual rotary drives which permit only a restricted swivel interval into one or the other rotary direction from a neutral position. A precise and quiet adjustment is achieved in connection with such fine-membered teething. An outer teething, or an inner teething worked into a ring-shaped area can alternatively be selectively provided for the drive wheel.

DESCRIPTION OF THE DRAWINGS

The invention will now be explained in further detail with reference to the embodiment shown in the accompanying drawings, in which:

FIG. 2c is a rear perspective view of the drive without housing cover;

FIG. 2d is a perspective view from the side of the pinion;

DETAILED DESCRIPTION OF THE INVENTION

Figure 1A:
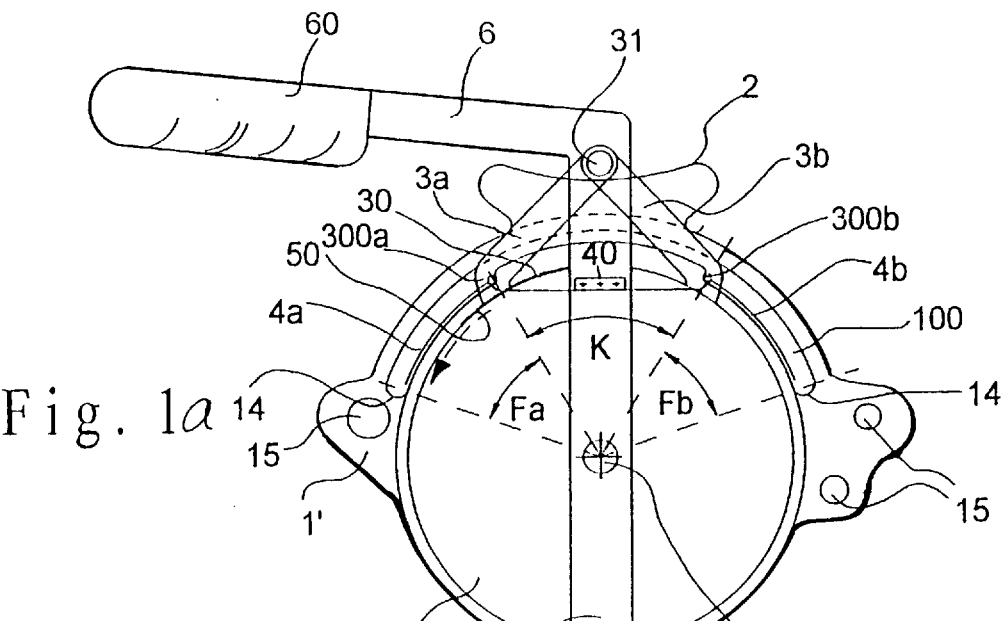
FIG. 1a is a diagrammatic illustration of the drive device, with detent elements on the outside, in a neutral position on a drive wheel.

The diagrammatic illustration of FIG. 1a shows the front view of one embodiment of a drive device according to the invention, with external detent elements 3a, 3b, in a neutral position. The detent elements 3a, 3b bear about a swivel axis 31 on a drive lever 6. Their free ends are provided with teething 30 which can be brought into engagement with external teething 50 of a drive wheel 5. The teething 50 extends about the entire circumference of the drive wheel 5. The teething is shown on only a representative portion of the drive wheel 5 in FIG. 1a. The drive wheel 5 is rigidly connected to a drive axle 10 which also supports a gear wheel (pinion 11) which is shown in FIG. 2d.

A slide guide 100 comprises a central slide guide area K for cams 300a, 300b of the detent elements 3a, 3b as well as spring areas Fa, Fb adjoining each side of the central slide guide area K. The slide guide 100 is incorporated in a housing plate 1'. In this area there are spring elements 4a, 4b which act on the cams 300a, 300b. The spring 4 with its free arms 4a and 4b is locked on a housing cover (not shown) through a fixing area 40.

In the neutral position of the drive, the cams 300a, 300b, of the detent elements 3a, 3b are located, respectively, at the junction between the slide guide area K and the adjoining spring areas Fa, Fb. In the neutral position, the cams 300a, 300b are influenced neither by the slide guide K nor by the spring arms 4a, 4b. A spring 2 acting jointly on the detent elements 3a, 3b biases both detent elements onto the drive wheel 5 which ensures that their teething 30 engage in the counter teething 50 of the drive wheel 5. Consequently, no idling stroke can occur in the drive, and any drive force introduced through the handle 60 into the drive lever 6 leads directly to a rotary movement of the drive wheel 5.

In order to ensure that a drive movement is followed by an automatic return of the drive or drive lever 6 itself to the neutral position, the drive lever 6 has an extension projecting over the edge of the housing plate 1' and supporting a stop 61. This stop 61 is in contact with the spring arms 13a, 13b of a resetting spring which is preferably designed as a rotary spring.

Figure 1B:
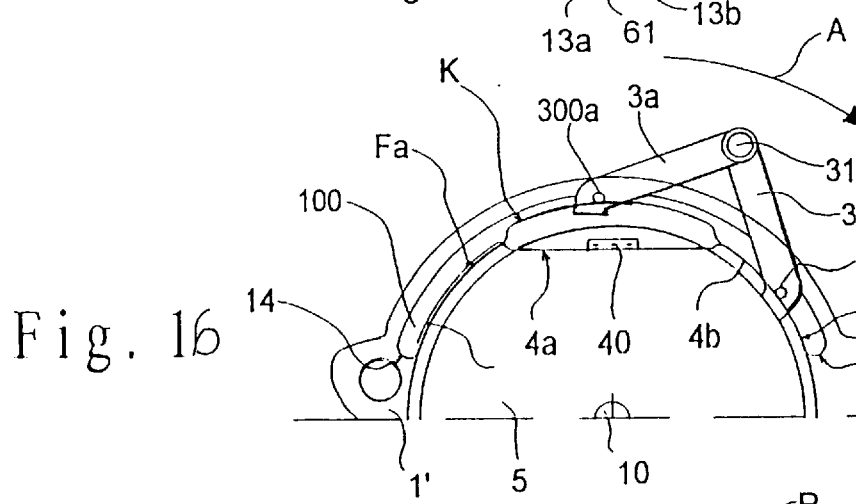
FIG. 1b is an illustration of the drive according to FIG. 1a under a drive force in the clockwise direction.
Figure 1C:
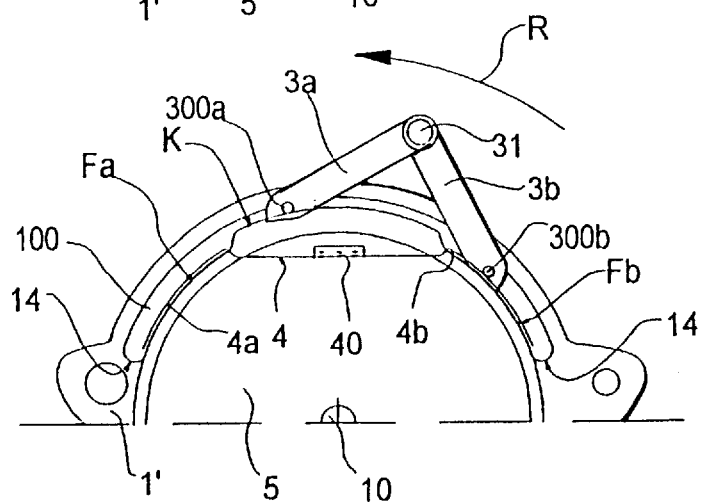
FIG. 1c is an illustration of the drive according to FIG. 1a during a resetting movement back into the neutral position.

FIG. 1b shows the drive according to FIG. 1a during a drive movement into clockwise direction A. The teething 30, 50 are designed so that they have a self-locking action under the effect of a drive force, that is, the teething 30 of the corresponding detent element 3b cannot be pressed out of the counter teething 50 of the drive wheel 5 through the spring arm 4b. During the drive movement, the cam 300a of the detent element 3a slides on the slide guide K whereby its teething 30 is lifted out of the counter teething 50. This prevents drive noises from occurring during the transfer of a drive force. The cam 300b of the detent element 3b located on the drive side presses the spring arm 4b down until the drive is returned by the resetting movement R to its neutral position. With the absence of any load on the drive side in a radial direction into the drive wheel 5, the spring arm 4b lifts the detent element 3b and thereby the cam 300b out of the counter teething 50. Thus the resetting movement can likewise take place in a substantially silent manner (see FIG. 1c).

During swivel movement of the drive in the opposite direction (not shown) the detent element 3a would be subject to load on the drive side, and during the drive movement would press the spring arm 4a down while the drive lever 3b slides through its cam 300b on the slide guide K and thus disengage from the counter teething 50. A resetting movement of the drive in the direction of its neutral position would, according to the variation already described, lead to the detent element 30 lifting out of the counter teething 50.

When sizing up the drive, it should be observed that the spring force of the arms 4a, 4b should not overcome the counter force of the spring 2, which presses the detent elements onto the drive wheel, in the neutral position.

Fixing holes 15 are used to fix the drive, for example on the side plate of a seat frame in order to allow manual seat adjustment.

FIGS. 2a to 2d show different perspective views of a drive according to another embodiment showing the interaction of the detent elements with a locking device 7. The friction locking device blocks all the torque transfers on the output side, and its locking action is released for torques on the drive side. Corresponding clamping jaws such as those described in German Patent No. DE 4120617, are mounted inside the housing 12 of the locking device 7. On the output side a pinion 11 is in fixed connection with the drive axle 10. A coil-shaped resetting spring 13 is positioned on the outer circumference of the housing 12 of the locking device. Its free ends 13a, 13b are connected with the stop 61 of the drive lever 6 and another stop 62 fixed on the housing. One of the spring arms 13a, 13b is always in connection with stop 61 and the other arm 13a, 13b is always in connection with the second stop 62; and which spring arm 13a, 13b is in connection with which stop 61, 62 depends on the swivel direction of the drive.

Figure 2A:
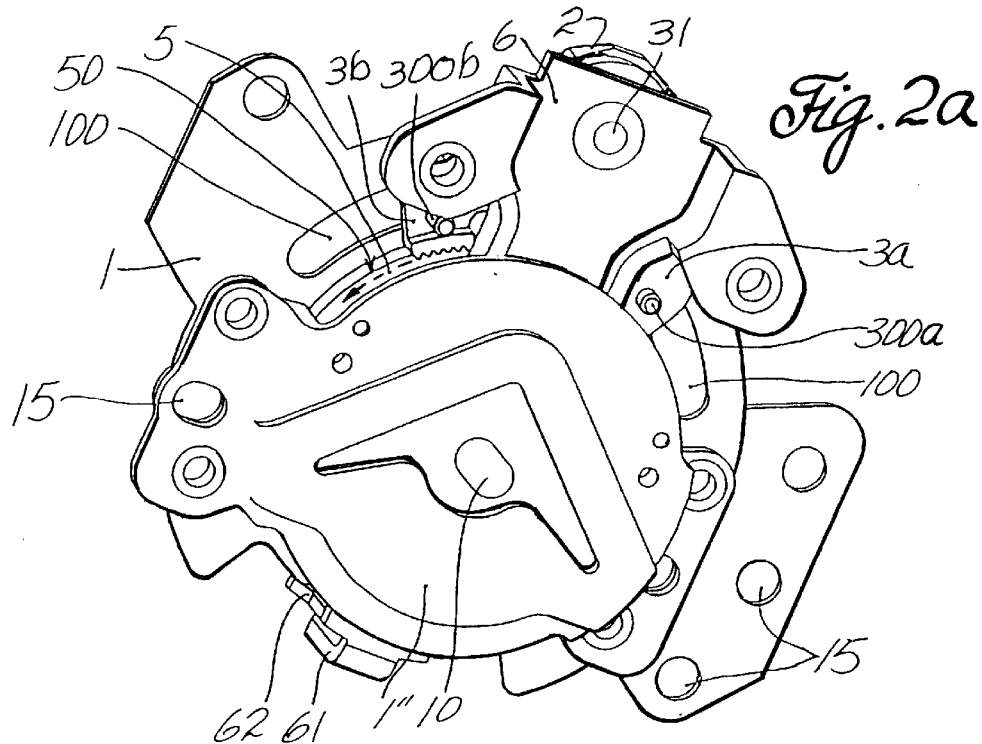
FIG. 2a is a front perspective view of a drive with housing cover.
Figure 2B:
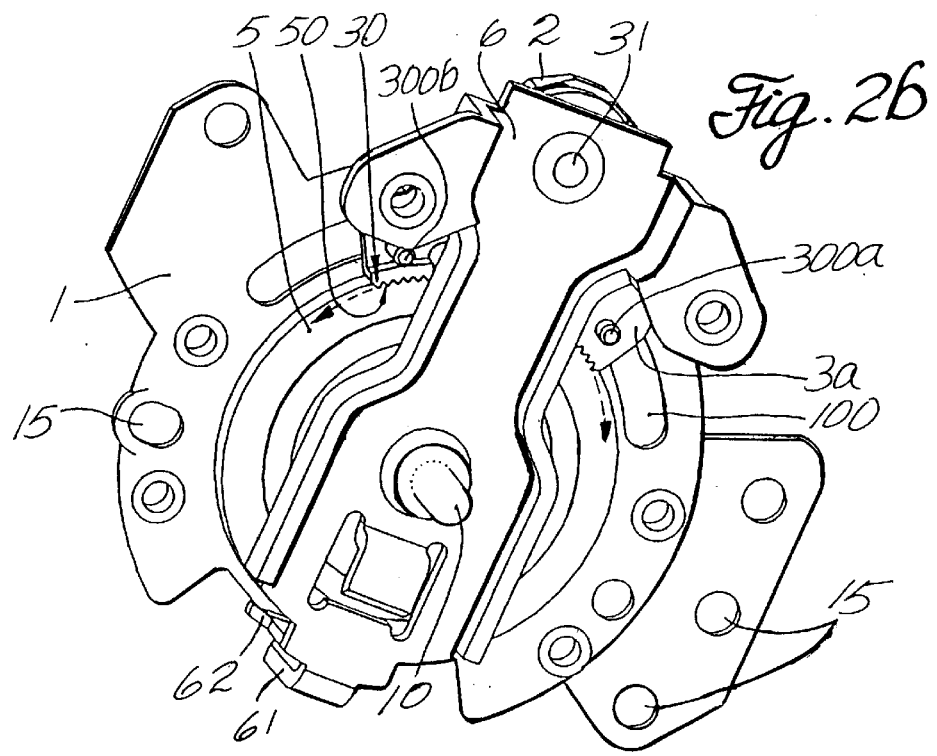
FIG. 2b is a front perspective view of the drive without housing cover.
Figure 2E:
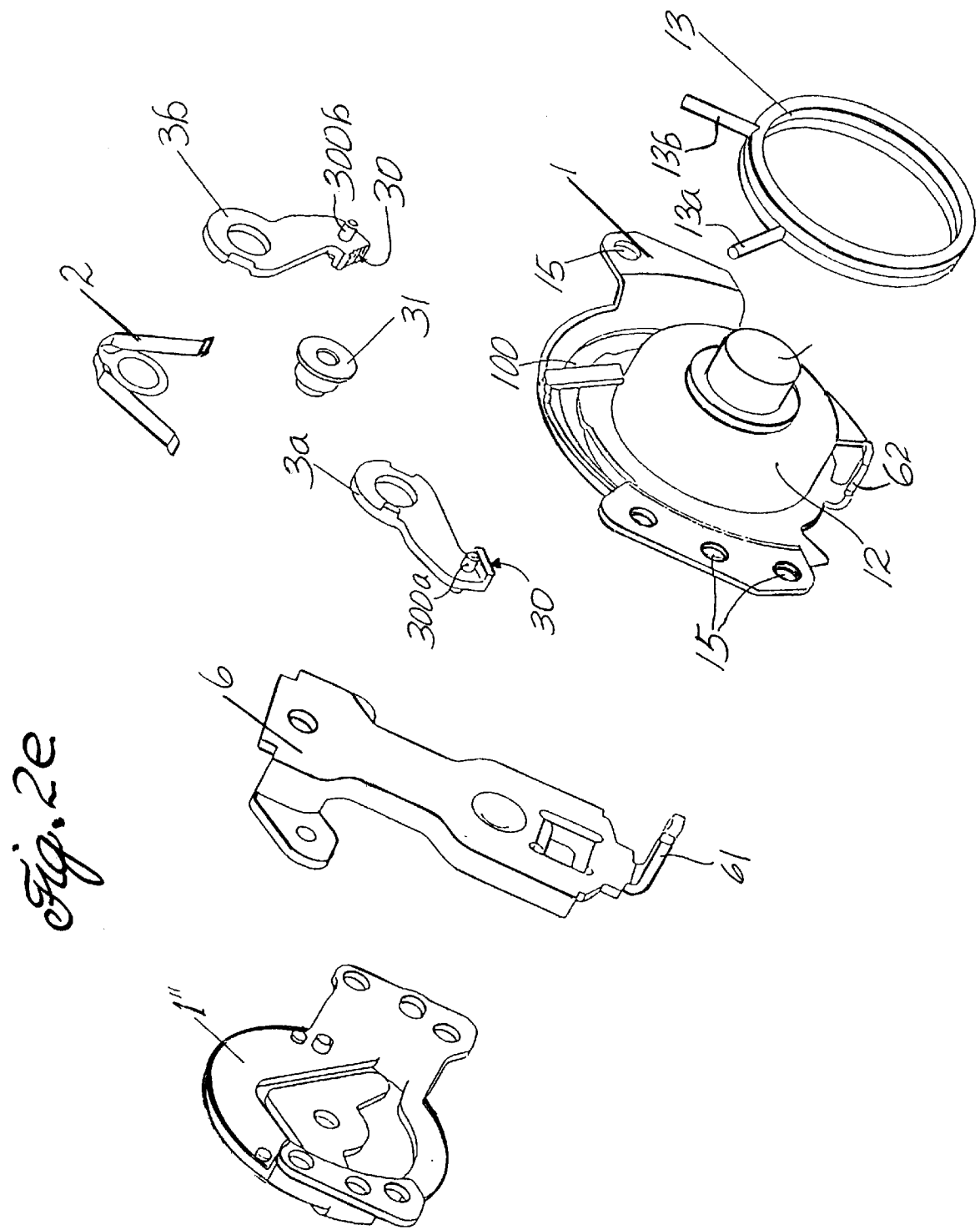
FIG. 2e is an exploded perspective view of the individual parts of the drive.

A front view of the drive on the drive side is shown in FIG. 2b. From this illustration, it is easy to see the extension of the drive lever 6 and drive wheel 5. FIG. 2a shows the drive closed by a housing cover 1". The housing cover 1" supports the spring formed as a two-sided arm spring 4a, 4b (FIG. 1a) centrally through a screw connection. FIG. 2e shows an exploded view of the drive unit to better depict its individual components.

Figure 3:
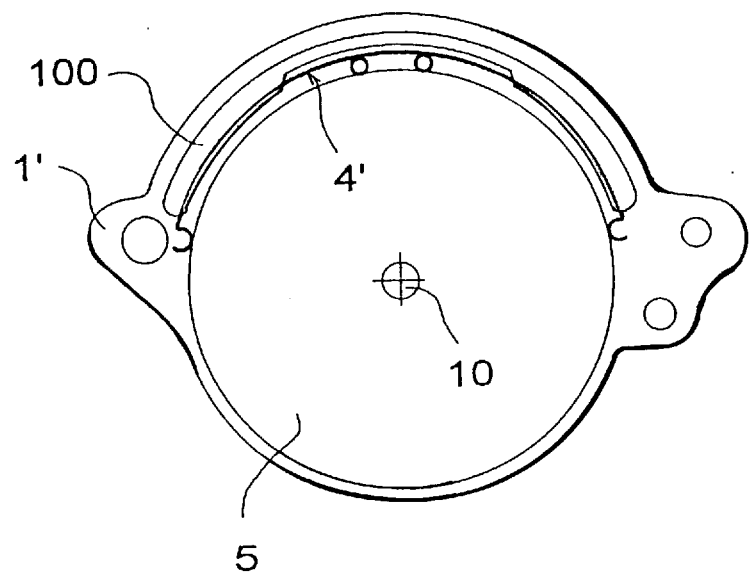
FIG. 3 shows a housing plate with a slide guide and a one-piece spring.
Figure 4:
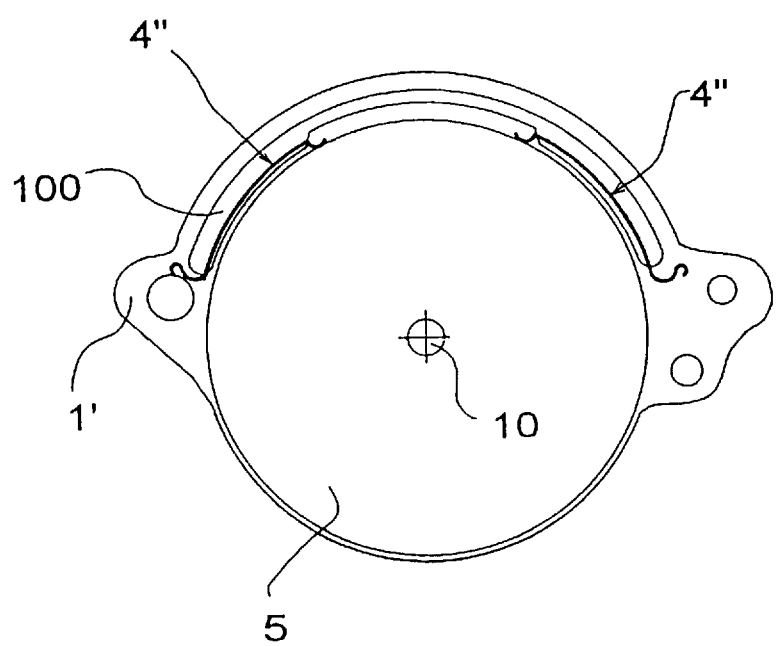
FIG. 4 shows a housing plate with the slide guide and two-piece spring.

FIGS. 3 and 4 show alternate embodiments of the shape of spring areas according to the invention in the area of the slide guide 100. Whereas FIG. 3 shows a one-piece spring 4', the embodiment according to FIG. 4 uses a separate spring 4" for each spring area. In both cases, the springs 4',4" are connected to the housing plate 1'. It is advantageous to form the spring areas by means of leaf springs.

Figure 5:
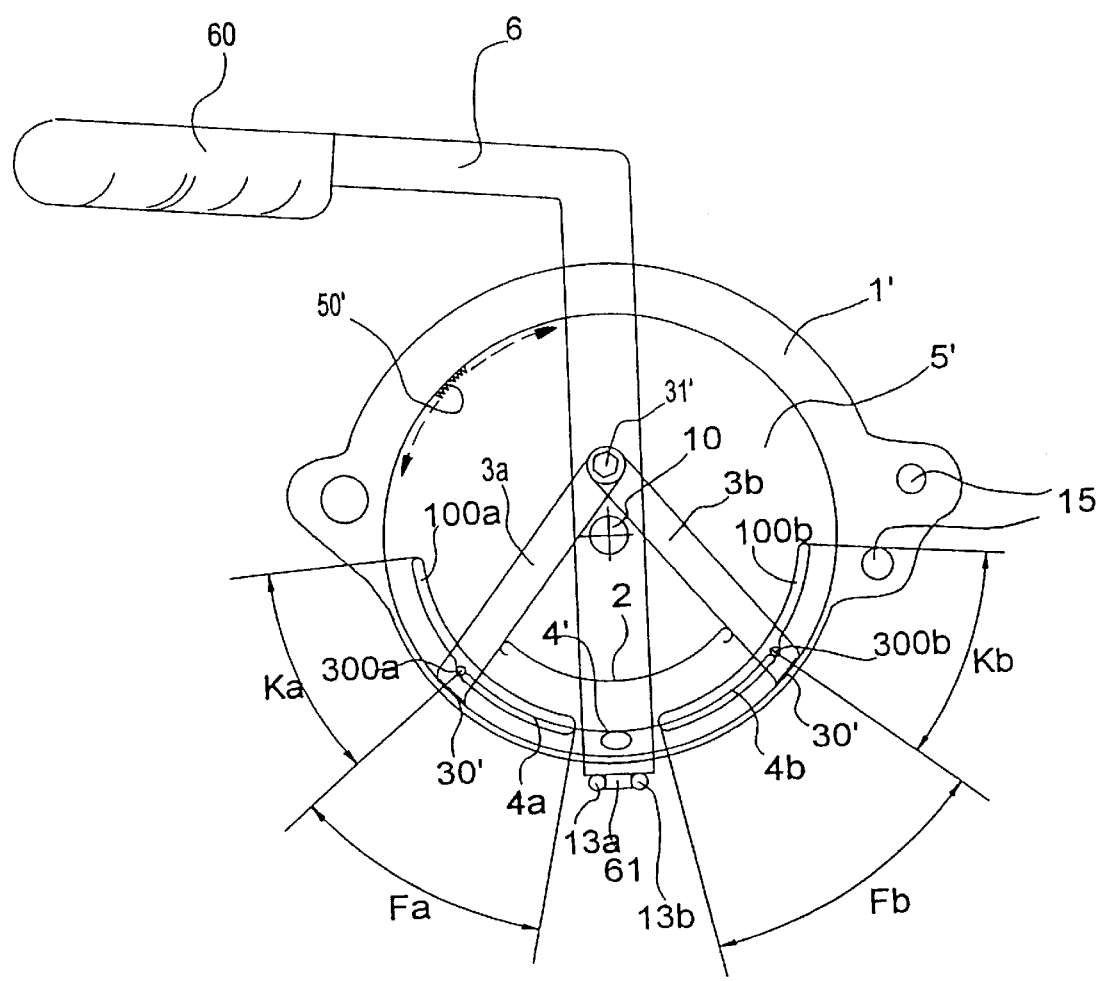
FIG. 5 is a diagrammatic illustration of a drive unit, having inner detent element, in the neutral position.

FIG. 5 shows a further embodiment of the invention which corresponds substantially to the embodiment shown in FIG. 1a. The main difference lies in that the drive wheel 5' has an inner teething 50' with which the counter teething 30' of the detent elements 3a, 3b can engage. Correspondingly the detent elements 3a, 3b are mounted inside the outer contour of the drive wheel 5' on the drive lever 6.

FIG. 5 shows the drive in its neutral position, where the teething 30',50' engage with each other owing to the spring force of the spring 2. As opposed to the variation in FIG. 1a, the slide guides 100a, 100b here are not in direct connection with each other. They likewise have however slide areas Ka, Kb which can act on the cams 300a, 300b so that during swivel movement of the drive lever 6, the detent element 3a or 3b not loaded by a drive force is lifted with its teething 30' out of the counter teething 50'. The areas Fa, Fb adjoining same have spring arms 4a, 4b which during return of the drive lever into its neutral position keep the corresponding detent elements 3a, 3b away from the counter teething 50' so that no resetting noises arise. The slide guides 100a, 100b are preferably designed as recesses in a housing cover (not shown).

This embodiment of the invention presents a particularly advantageous design which in its combination of spring-controlled detent elements 3a, 3b with the arrangement of the detent elements 3a, 3b inside the counter teething 50' of the drive wheel 5' both ensures a silent operation and allows a more compact method of construction and protected arrangement of all mechanical movable component parts inside a housing.

Although the present invention has been described with respect to particular embodiments, those skilled in the art will appreciate that the present invention may be modified without departing from the scope of the invention. Accordingly, all such modifications are intended to be included within the scope of the invention as defined by the following claims.

We claim:

1. Manual drive operating for producing a rotary movement in both clockwise and counter-clockwise directions comprising:

a drive axle;

a drive lever mounted on the drive axle which has a neutral position and can swivel within a restricted angle into a first and a second rotary direction and then return to the neutral position;

a drive wheel comprising teething elements arranged on a circumference thereof;

first and second swivel detent elements, each connected to the drive lever at a first end and each having a second free end provided with teething elements for engagement with the teething elements on the circumference of the drive wheel to engage the drive wheel, wherein the first swivel detent element is loaded and engages the drive wheel when the drive lever is swivelled in the first rotary direction and the second swivel detent element is loaded and engages the drive wheel when the drive lever is swivelled in the second rotary direction;

a slide guide, having two sides, on which the first and second swivel detent elements are slidably mounted, the slide guide being configured to lift the first swivel detent element away from engagement with the drive wheel when the drive lever is swivelled in the second rotary direction and to lift the second swivel detent element away from the teething of the drive wheel when the drive lever is swivelled in the first rotary direction;

a first spring area on one said side and outside of the slide guide and a second spring area on the other said side and outside of the slide guide;

a first spring element in the first spring area which exerts a force against the engagement direction of the teething on the first swivel detent element away from the teething elements on the circumference of the drive wheel, wherein the force is insufficient to disengage the teething elements of the first swivel detent element from the teething elements of the drive wheel when the first swivel detent element is loaded, but sufficient to lift the first swivel detent element out of engagement when the first swivel detent element is unloaded and the drive lever is not in the neutral position; and a second spring element in the second spring area which exerts a force against the engagement direction of the teething on the second swivel detent element away from the teething elements on the circumference of the drive wheel, wherein the force is insufficient to disengage the teething elements of the second swivel detent element from the teething elements of the drive wheel when the second swivel detent element is loaded, but is sufficient to lift the second swivel detent element out of engagement when the second swivel detent element is unloaded and the drive lever is not in the neutral position.

2. A manual drive according to claim 1 wherein the first swivel detent element has a cam which in the neutral position of the drive lever is positioned on a border between the slide guide area and the first spring area and engages both with the slide guide and with the first spring element, and wherein the second swivel detent element has a cam which in the neutral position of the drive lever is positioned on a border between the slide guide area and the second spring area and engages both with the slide guide and with the second spring element.

3. A manual drive according to claim 1 wherein both spring areas are defined by a one-piece spring.

4. Drive according to claim 3 wherein the drive unit is substantially contained in a housing and wherein the one-piece spring is fixed to a central area of the housing.

5. A manual drive according to claim 1 wherein the two spring areas are each defined by a separate spring element.

6. A manual drive according to claim 1 wherein the teething elements are provided on the outer circumference of the drive wheel and the detent elements are mounted on an outer axle of the drive lever.

* * * * *